United States Patent
Tofighbakhsh et al.

(10) Patent No.: US 10,979,913 B2
(45) Date of Patent: Apr. 13, 2021

(54) WIRELESS NETWORK COVERAGE BASED ON A PREDETERMINED DEVICE CLUSTER MODEL SELECTED ACCORDING TO A CURRENT KEY PERFORMANCE INDICATOR

(71) Applicant: AT&T Intellectual Property I, L.P., Atlanta, GA (US)

(72) Inventors: Mostafa Tofighbakhsh, Cupertino, CA (US); Deva-Datta Sharma, San Ramon, CA (US); Bogdan Ungureanu, Holmdel, NJ (US); Rittwik Jana, Montville, NJ (US); Shraboni Jana, Danville, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/374,719

(22) Filed: Apr. 3, 2019

(65) Prior Publication Data
US 2020/0322814 A1    Oct. 8, 2020

(51) Int. Cl.
*H04W 24/02* (2009.01)

(52) U.S. Cl.
CPC .................. *H04W 24/02* (2013.01)

(58) Field of Classification Search
CPC ........... H04W 72/0446; H04W 72/042; H04W 72/0453; H04W 74/0833; H04W 76/27
See application file for complete search history.

(56) References Cited

U.S. PATENT DOCUMENTS

| | | | |
|---|---|---|---|
| 10,148,510 B2 | 12/2018 | Dunn et al. | |
| 2003/0169746 A1* | 9/2003 | Kitazawa | H04L 47/10 370/395.42 |
| 2014/0162682 A1 | 6/2014 | Tafreshi et al. | |
| 2015/0092704 A1* | 4/2015 | Chen | H04W 72/1231 370/329 |
| 2018/0035419 A1* | 2/2018 | Beattie, Jr. | H04W 72/048 |
| 2018/0175992 A1 | 6/2018 | Froberg Olsson et al. | |
| 2018/0235013 A1 | 8/2018 | Jung et al. | |
| 2018/0376501 A1 | 12/2018 | Wilson et al. | |

(Continued)

FOREIGN PATENT DOCUMENTS

EP    2919517 A1 *    9/2015

*Primary Examiner* — Joshua L Schwartz
(74) *Attorney, Agent, or Firm* — Amin, Turocy & Watson, LLP

(57) ABSTRACT

Adapting wireless network coverage areas according to beam parameters corresponding to predetermined radio cluster models is disclosed. The disclosed subject matter can enable determining cluster models corresponding to historic use of a wireless network, e.g., based on historical KPIs, etc., from UEs, RAN devices, antennas, and other sources. The cluster models can correspond to beam parameters. The cluster model of the cluster models can be selected based on a current KPI value, e.g., a real-time or near real-time wireless network measurement, e.g., from a UE, RAN device, antenna, etc. Beam parameters corresponding to the selected cluster model can be communicated to a RAN device which can generate a corresponding radio beam. In an aspect, this can provide wireless connectivity to clusters of devices in the area of the radio beam, wherein the devices of the clusters can, in some embodiments, share same or similar wireless network demands.

20 Claims, 10 Drawing Sheets

(56) References Cited

U.S. PATENT DOCUMENTS

| | | |
|---|---|---|
| 2019/0007916 A1 | 1/2019 | Petrus et al. |
| 2019/0053101 A1* | 2/2019 | Tsuda .................. H04W 24/08 |
| 2020/0145079 A1* | 5/2020 | Marinier ........... H04W 74/0833 |

* cited by examiner

WIRELESS NETWORK COVERAGE BASED ON A PREDETERMINED DEVICE CLUSTER MODEL SELECTED ACCORDING TO A CURRENT KEY PERFORMANCE INDICATOR

TECHNICAL FIELD

The disclosed subject matter relates to wireless network coverage, more specifically to providing wireless network coverage that can be altered based on a predetermined device cluster model to provide a corresponding beam of radio energy that can serve a cluster of devices, wherein the predetermined device cluster model can be selected from a group of predetermined device cluster models based on a current key performance indicator value.

BACKGROUND

The evolution of wireless networks is providing technologies that can provide highly directed beams of radio energy that can typically serve single devices. As an example, 5G wireless communication is expected to provide each user equipment (UE) or device with a beam of radio energy in contrast to previous technologies that generally provided broader coverage of multiple UEs/devices in a larger region, e.g., service provided to all devices in a 120-degree sector of a cell site. This maturation of wireless network technologies can result in many individual beams each serving a corresponding UE/device. This can lead to increased computation to determine the numerous beams, compensate for sidelobes to those numerous beams in order to reduce interference, etc., and can be associated with more complex instantiations of base station resources to support the numerous beams. As an example, where a region of a wireless network covers 1000 UEs, the base stations can provide 1000 distinct beams of radio energy, which can require computing timing delay, phase shifting, amplitude adjustments, etc., to many radiative elements of an antenna to provide the 1000 beams, and can further require altering these computations to reduce inference associated with the 1000 beams. Additionally, in this example, there can be further computations related to multiplexing, in time, frequency, etc., related to effectively providing communication for the 1000 devices via the 1000 beams. When performed properly, the 5G-type wireless network technology can provide fast and reliable wireless service. However, the computations can be so complex that proper performance can be highly demanding and performance can be sub-optimal. While even sub-optimal performance can still be fast and reliable, it can be desirable to provide wireless network service in a less complex and resource intensive manner.

DETAILED DESCRIPTION

Figure 1:
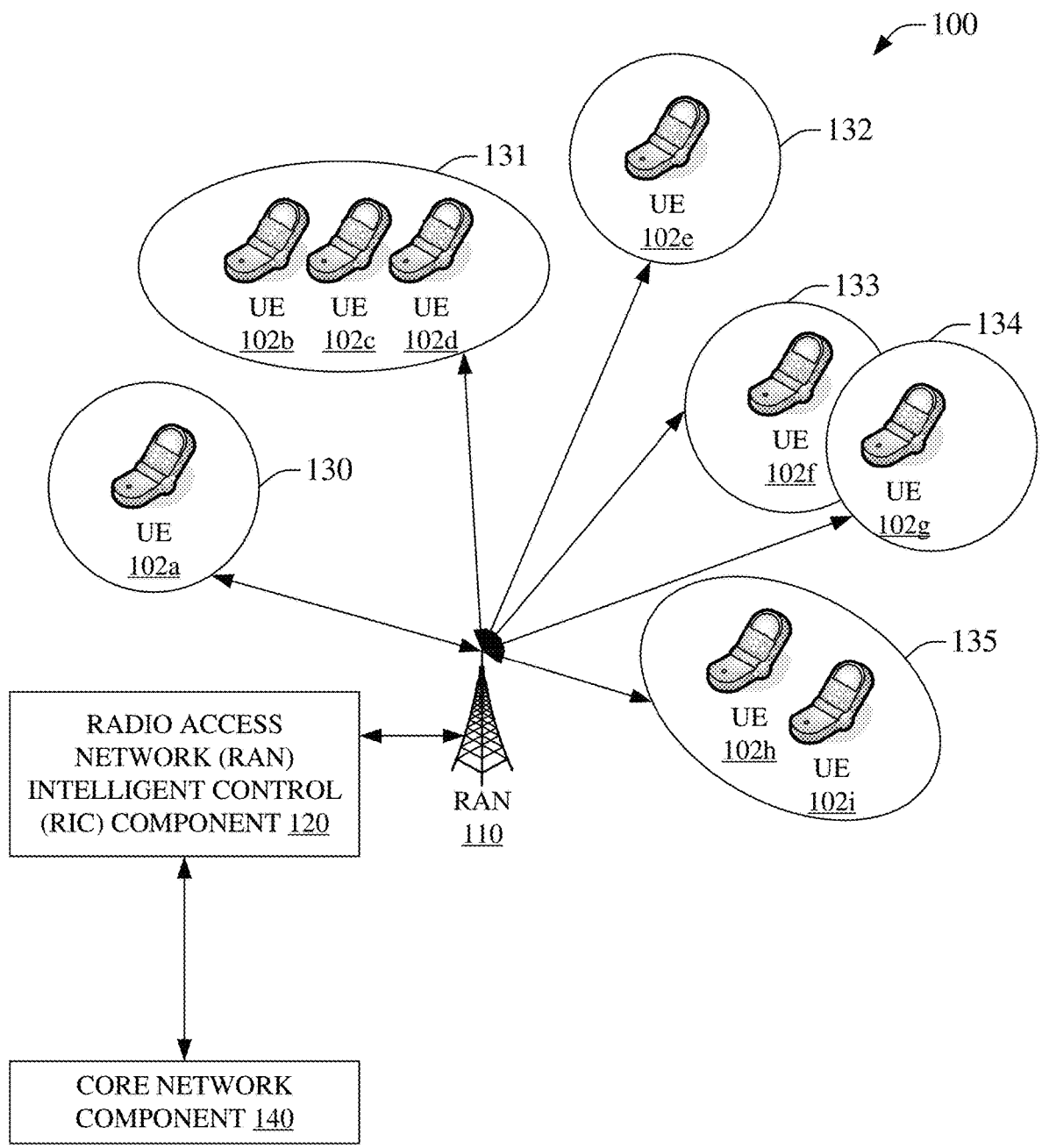
FIG. 1 is an illustration of an example system that can facilitate adapting wireless network coverage based on a predetermined device cluster model, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As wireless networks continue to evolve, they are beginning to be able to provide highly directed beams of radio energy that typically are used to provide wireless connectivity to individual devices, individual UEs, etc., e.g., in 5G wireless networks, e.g., a 5th generation compliant wireless network according to the 3rd Generation Partnership Project, each UE or device can be provided with a highly directed beam of radio energy to support wireless connectivity, which can contrast previous wireless technologies that generally supplied less directed beams of radio energy that covered more devices residing in the less directed beam, such as a 120-degree cell site sector, an omnidirectional beam, etc. However, while highly directional beams of radio energy each serving an individual device, UE, etc., can provide some benefits, the formation of these highly directional beams can be complicated, computationally intensive, energy intensive, slow to determine in comparison to a fixed broad beam or omnidirectional beam, etc.

In some circumstances it can therefore be desirable to avoid unnecessary complex calculations, energy higher energy consumption, and comparatively slow determining of highly directional beams, for example where a less highly directional beam can provide service above a threshold level, by precomputing highly directional beams based on known conditions, etc. The presently disclosed subject matter relates to providing beams tailored to providing wireless service to both individual devices and clusters of devices. In an aspect, a cluster of devices can be distinguished from all eligible devices in a region, e.g., the devices comprising the cluster of devices can have a same or a similar performance requirement. As an example, a conventional 120-degree cell sector can support wireless connectivity to any device in the sector, while in contrast, a base station employing the technology disclosed herein, can support connectivity to clusters of devices in a 120-degree region of wireless coverage, wherein a cluster can be, for example, a cluster of internet of things (IoT) devices that can all have relaxed latency, low speed, and low bandwidth requirements in comparison to another cluster that can be, for example, a cluster of self-driving vehicles that can have very low latency, high bandwidth, and high speed requirements. As such, recognizing that devices having the same or similar characteristic wireless connectivity requirements, that are within a threshold distance or proximity of each other, in total do not exceed the performance of a shared beam of radio energy, etc., can be leveraged to determine beam parameters that can result in a beam that serves one or more device.

The beam parameters for various conditions can be determined allowing a 'library' of cluster models to be precomputed. This library can then enable selection of a cluster model of the cluster models according to current and/or predicted conditions, whereby beam parameters already determined for the selected cluster model can be implemented with less real-time computation than can be experienced in computing highly directional beams that each serve an individual device. This technology is distinct from earlier generations of wireless technology that typically served all devices in a region, and can also be distinct from more recent generations of wireless technology that aims to serve all individual devices with corresponding individual highly directional beams of radio energy and, in an aspect, can be viewed as enabling wireless connectivity to clusters of devices with beams having an adaptable level of directionality. As an example, while recent wireless technology can aim to provide a first beam for a cell phone in a user's pocket, a second beam for a laptop under the user's arm, a third beam for the user's smart watch, a fourth beam for a pedometer built in to the user's shoes, etc., the presently disclosed technology can determine that a single beam can be made wide enough to cover all of the user's devices. This example can therefore reduce the computation to one beam rather than four or more beams. Moreover, the computation can be performed ahead of time, e.g., a beam covering an average user can be precomputed, a beam covering the specific user and devices can be precomputed, a beam covering an average user in the environment for a given location can be precomputed, etc., which cluster models can be stored, such that, when the multiple devices of the user are determined to satisfy a selection rule, a corresponding cluster model can be selected and the precomputed beam parameters can be quickly implemented, with minimal further computation, to create or adapt a beam that is broad enough to cover the user's several devices.

In another example, wireless coverage of a shopping mall can correspond to historical UE patterns that can be leveraged to implement less highly directional beams. In this example, there can be a higher UE density at entrances to the mall, in the food court of the mall, and lower densities of UEs in other areas of the mall. Accordingly, these patterns can be employed, such as via machine learning, artificial intelligence, etc., to select regions of the mall that can have or can be expected to have a threshold UE density. Cluster models can then be precomputed for these regions. In an aspect, the cluster models can reflect tiers of use, e.g., where bandwidth consumption is low in a region the cluster model can reflect a larger area for a beam, another model can be for moderate bandwidth consumption having a narrower beam footprint, a further model can correlate an even narrower beam footprint to high bandwidth consumption conditions, etc. In this example, different precomputed mall cluster models can then be selected from the group of precomputed mall cluster models based on current conditions at the mall, again allowing rapid deployment or adaptation of beams providing wireless service in the shopping mall. As an example of this aspect, the precomputed mall luster models can include a wide beam for the whole food court corresponding to 9:30 a.m. to 11:30 a.m. on a Tuesday based on that period historically having low wireless performance requirements by devices in the food court, while a second model can include 16 narrower beams for 11:30 a.m. to 1:30 p.m. on the Tuesday based on Tuesday lunchtime being historically busier and having higher network demands. Accordingly, the precomputed wide beam model can be implemented in the mall food court on Tuesday at 9:30 a.m., and can be adapted to 16 narrower beams at 11:30 a.m., or, in the alternative, where other network demands are detected before 11:30 a.m., another beam model can be selected and implemented to provide more/less beams, wider/narrower beams, etc. Cluster models can be based on nearly any number of criteria and can correspondingly indexed by any or all of these criteria, allowing for current or predicted conditions, e.g., KPIs, etc., to enable selection of a cluster model that can correspond to the conditions to enable use of beams having different levels of directionality tailored to the current or expected conditions.

In an embodiment, a network element, e.g., a radio intelligent control (RIC) component, etc., can be deployed to manage cluster model selection at a more local level to a RAN device, although in some embodiments, the cluster model selection can be performed at components more remote from a RAN device, e.g., at a network core device, etc. Where a RIC component is employed, in some embodiments, the RIC component can be located at a RAN device, at a base station device, etc. In other embodiments, a RIC component can be located at a regional location that can serve one or more RAN components, e.g., the RIC component can be logically located between a network core component and one or more RAN components, etc. In an aspect a RIC component can locally cache cluster models corresponding to the region served by RAN devices coupled to the RIC component, e.g., rather than the RIC component storing all cluster models for a whole wireless network, the RIC component can store fewer cluster models corresponding to the regions covered by the base stations coupled to the RIC component. Accordingly, a wireless network can comprise many RIC components each corresponding to a portion (s) of a RAN. The RIC component, in an aspect can cause a selected cluster model to be instantiated, resulting in a corresponding adapted beam.

In an aspect, the presently disclosed technology can work in conjunction with evolving technologies, e.g., 5G wireless networks, etc. There can be many situations where "clusters of one device" can be appropriate and desirable and, in these situations, a highly directional beam for a single device can be implemented. Additionally, where the situation arises that multiple devices can be served by the same beam, more especially where the beam can be less directional, e.g., broad enough to cover multiple devices having some common characteristic, avoiding multiple "clusters of one device" can be beneficial. Accordingly, both clusters of one device and clusters of more than one device can exist in the same environment. In some embodiments, beams can overlap, e.g., a first beam can serve multiple devices at a first region encompassing an entrance to a mall while a second beam tracks a self-driving car as it passed through the first region, e.g., the self-driving car can remain served by the second beam and does not need to be served by the first beam because the character of the communication to the self-driving can, even though in the same region as devices of the first beam, can be significantly distinct from the devices of the first beam. In other embodiments, single and cluster beams may not overlap but can still be provided by a RAN device, e.g., a RAN device for the example mall can provide some cluster beams, e.g., at the mall entrance, food court, bathrooms, etc., while also providing other single device beams, e.g., to devices wandering the halls of the mall, to high demand devices, to a far flung IoT device, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate providing wireless network coverage that can be adapted based on a predetermined device cluster model, in accordance with aspects of the subject disclosure. System 100 can comprise RAN component 110, hereinafter simply RAN 110, etc. RAN 110 can provide wireless network coverage to a region of a wireless network, for example, RAN 110 can be an NodeB, an eNodeB, a gNodeB, an access point (AP) such as a femto cell, WiFi AP, etc., or nearly any other device that can facilitate a wireless link between a wireless network and a device such as a UE, IoT device, etc. RAN 110 can communicate with RIC component 120, hereinafter RIC 120, etc.

RIC 120 can enable instantiation of a beam of radio energy by RAN 110 that can facilitate wireless communication between a wireless network and a device via RAN 110. In an aspect, RIC 120 can facilitate communication of beam parameters that can be implemented by components of RAN 110 to generate a beam having characteristics related to the beam parameters, e.g., in a multi element antenna, beam parameters can relate to power, phase, delay, etc., of the elements allowing control over the directionality of a generated beam of radio energy. This can allow steering of the beam, tracking of one or more device by the beam, changing a characteristic of the beam based on changes to the characteristics of the devices, e.g., widening a beam footprint where devices diverge from a location, contracting a beam where devices come closer together, elongating/contracting a beam to become more/less elliptical, etc., altering a footprint or coverage region of the beam, etc. In some embodiments, the beam parameters can also relate to aspects of the side-lobes, e.g., changing a number of antenna elements employed in generating a beam can alter the shape, size, direction, etc., of the beam, e.g., main lobe, and the side lobes. As such, modeling of possible beam parameters for a given environment can result in many beam models that have some distinguishing characteristics. Selection of a beam can therefore relate to the characteristics determined from modeling of different beams, e.g., for a given environment and given conditions, some beams can be better suited than other beams, which can be initially determined from the models of those beams and information about the environment and conditions.

In an embodiment, RIC 120 can communicate with core network component 140. In some embodiments, core network component 140 can provide RIC 120 with cluster models corresponding to regions of a wireless network covered by RAN 110, or other RAN components associated with RIC 120. As an example, where RAN 110 provides wireless network coverage to a shopping mall, RIC 120 can receive cluster models corresponding to the shopping mall from core network component 140. The cluster models can be generated by core network component 140 based on historical information, e.g., historical RAN 110 KPIs, historical UE KPIs, historical antenna KPIs, historical location data for UEs, buildings, trees, etc., historical weather information, historical UE density, historical traffic patterns, or nearly any other historical information. In some embodiments, RIC 120 can store the received cluster models, e.g., storing 'local' cluster models rather than storing cluster models for an entire wireless network. RIC 120 can then select a cluster model from the cluster models received from core network component 140 and can communicate the corresponding beam parameters to RAN 110 to facilitate generating a corresponding beam to serve devices in the shopping mall. Selection of an appropriate cluster model by RIC 120 can be based on current or expected conditions, e.g., current or predicted KPIs of devices, the RAN, antennas, etc.

In an aspect, RAN 110 can instantiate a beam based on a selected cluster model. This can cause RAN 110, for example, to generate a first beam having a footprint 131 to facilitate a wireless connection to UEs 102b-102d. Moreover, RIC 120 can communicate other beam parameters to RAN 110 to enable generating other beams having other characteristics, e.g., different footprints, bandwidths, latencies, services, e.g., network slices, etc., powers, interferences, or nearly any other beam characteristic. As an example, a second beam can have a footprint 130 covering RAN 102a, and a third beam can have a similar footprint 132 covering UE 102c but the second and third beam can provide different network slices, e.g., they can provide different network services, for example the second beam can provide a voice over internet protocol service while the third beam can provide an ultralow latency service, etc.

In a further aspect, cluster models selected by RIC 120 can cause RAN 110 to adapt an existing beam, generate a new beam, cease an existing beam, etc. In an example, where UE 102f and 102g are proximate to each other and have similar wireless network demands, they can be served by a less directional beam (not illustrated). However, in this example, where the wireless network demands of UE 102*f* and 102*g* diverge sufficiently, RIC 120 can select different cluster models and communicate the corresponding beam parameters to RAN 110 causing the less directional beam to be adapted into two beams, e.g., a fourth beam having footprint 133 and a fifth beam having foot print 134, for example, individually serving each of UE 102*f* and 102*g* separately to provide distinct beam characteristics to the two devices. Conversely, in another example, UE 102*h* and 102*i* can initially have similar network demands but can be served by separate beams (not illustrated) due to being above a threshold distance apart. However, where it is determined that UE 102*h* and 102*i* have moved to be closer than the threshold distance apart, or alternative are predicted to become more proximate to each other, RIC 120 can instruct RAN 110 to merge the distinct beams into a less directional beam having footprint 135. Numerous other examples of beam instantiation in accord with the presently disclosed subject matter will be readily appreciated and are considered within the scope of the present disclosure even where not explicitly recited for the sake of clarity and brevity.

System 100 illustrates that cluster models can facilitate providing beams that are highly directional, e.g., providing service to individual devices, can facilitate providing beams that are less directional, e.g., providing service to clusters of devices, or a mix of both highly and less directional beams. In an aspect, less directional beams can be adapted into more directional beams. In a further aspect, more directional beams can be adapted in to less directional beams. Additionally, a cluster of devices can be selected based on nearly any characteristic of a cluster model, e.g., environmental characteristics, such as locations of buildings, walls, plants, weather, etc., antenna characteristics, such as number of elements, spacing of elements, subpanels of elements, nominal and peak power, processor speed of an element, etc., RAN characteristics, such as location, proximity to other RAN devices, antenna panel aim points, etc., UE characteristics, such as type of use, wireless network requirements, location, direction of movement, speed of movement, battery/power state, type of device, number of antennas, location of antennas, etc., or nearly any other modeled characteristic. This can allow for many cluster models for a same region of a wireless network. Accordingly, the models can be ranked, e.g., by performance, by effects on other beams (interference, etc.), by energy consumed, by computation needed, etc. As an example, it can take more energy to generate four beams for a given region than just one beam for the same given region, however, the one beam can be associated with a lower level of wireless network performance than the four beams. Accordingly, in this example, the one beam can be ranked higher because it consumes less power, however, the four beams can be selected based on a threshold level of network performance indicated by devices in the region. In an alternative for this example, the one beam can still be selected over the four beams despite having less than the threshold level of performance, for example, where the rank of the one beam is sufficiently greater than the rank of the four beam, e.g., the power consumption has a sufficiently great weight in the selection process, where another characteristic does not meet a threshold value, for example, the wireless network performance requirement is determined/predicted to be transient, etc.

Figure 2:
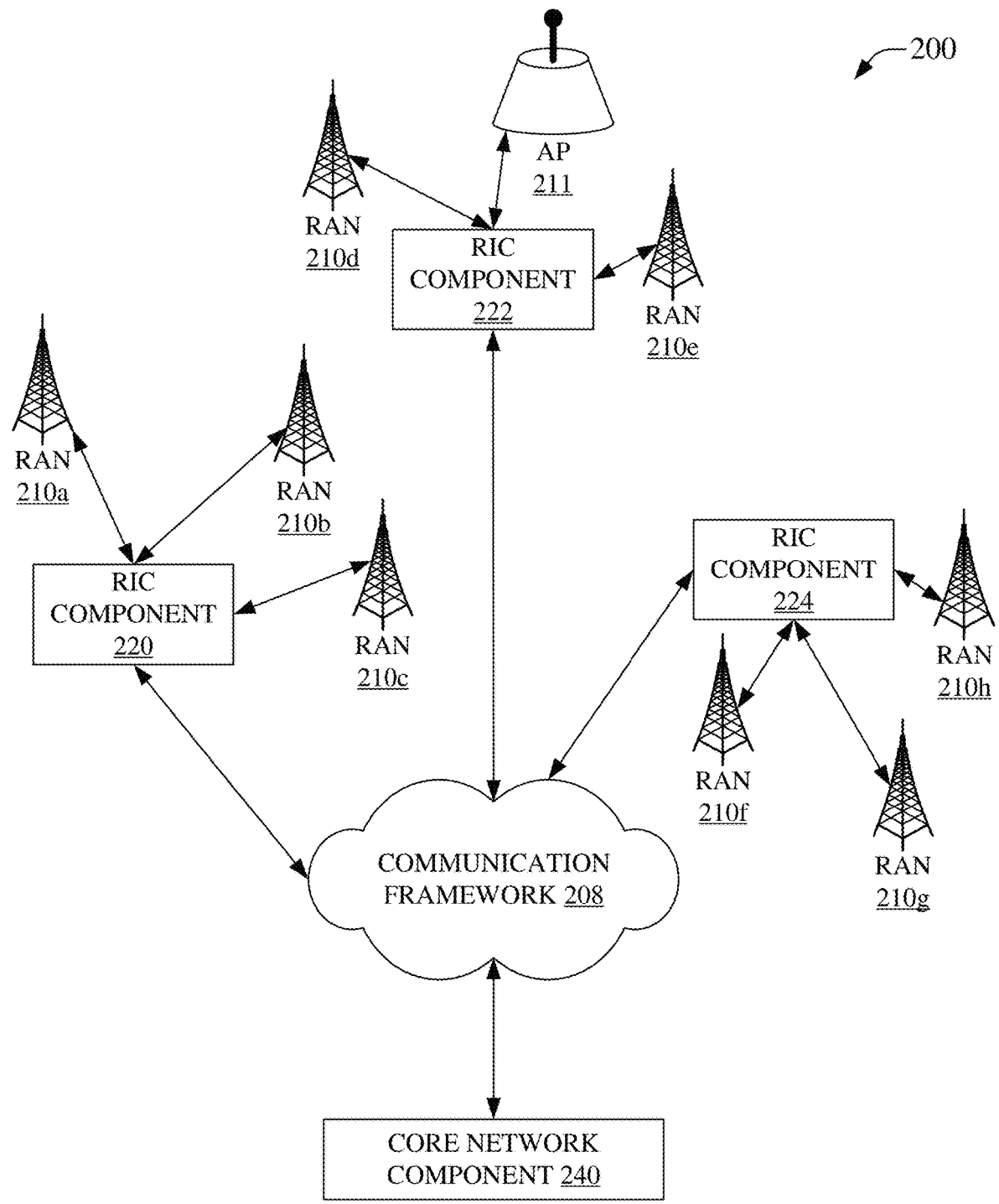
FIG. 2 is an illustration of an example system that can facilitate adapting areas of wireless network coverage based on a predetermined device cluster model for sites with multiple base stations, in accordance with aspects of the subject disclosure.

FIG. 2 is an illustration of a system 200, which can enable adapting areas of wireless network coverage based on a predetermined device cluster model for sites with multiple base stations, in accordance with aspects of the subject disclosure. System 200 can comprise more than one RIC, e.g., RIC component 220-224, etc. Additionally, each RIC can communicate with one or more RAN/AP, e.g., ROC 220 can communicate with RAN 210*a*-210*c*, RIC 222 can communicate with RAN 210*d*-210*e* and AP 211, RIC 224 can communicate with RAN 210*f*-210*h*, etc. Further, RICs can communicate with other RICs, e.g., RIC 220 can communicate with one or more of RIC 222, RIC 224, etc., via communication framework 208.

The RICs illustrated in system 200 can communicate with core network component 420 via communication frame work 208. Accordingly, network cluster models can be determined by core network component 240 and relevant groups of cluster models can be communicated to RICs, for example, based on the regions of the wireless network served by RANs connected to the RICs. As an example, a first group of cluster models corresponding to coverage areas of RAN 210*a*-210*c* can be communicated to RIC 220, a second group of cluster models corresponding to coverage areas of RAN 210*d*-210*e* and AP 211 can be communicated to RIC 222, a third group of cluster models corresponding to coverage areas of RAN 210*f*-210*h* can be communicated to RIC 224, etc. This can enable a RIC to select a cluster model from the group of cluster models and to communicate correlated beam parameters to the relevant RAN, as an example, RIC 220 can select a cluster model of the first group of cluster models and communicate the correlated beam parameters to RAN 210*a* to cause a beam according to the beam parameters to be formed by RAN 210*a* to support a device(s) in the coverage area of RAN 210*a*, etc.

In an embodiment, beam selection by a RIC can be further based on beam selection/implementation at a RAN connected to another RIC. As an example, RIC 220 can cause a first beam to be implemented by RAN 210*b* and can share this information to RIC 222 via communication framework 208. RIC 222 can base selection of a cluster model for RAN 210*d* based in part on the information about the first beam received from RIC 220. In practice, this can allow selection of cluster models to be considerate of other beams in the overall network, e.g., as directed by other RICs of the network. As an example, an example first beam from RAN 210*b* can have side lobes that can impinge on the coverage area of RAN 210*d*, accordingly, RIC 222 can select a cluster model to instantiate a second beam at RAN 210*d* that considers the possible effects from the first beam, for example the second beam can be rotated to reduce interference with the first beam, the second beam can have a smaller footprint, the second beam can be shifted away from the first beam, etc.

Figure 3:
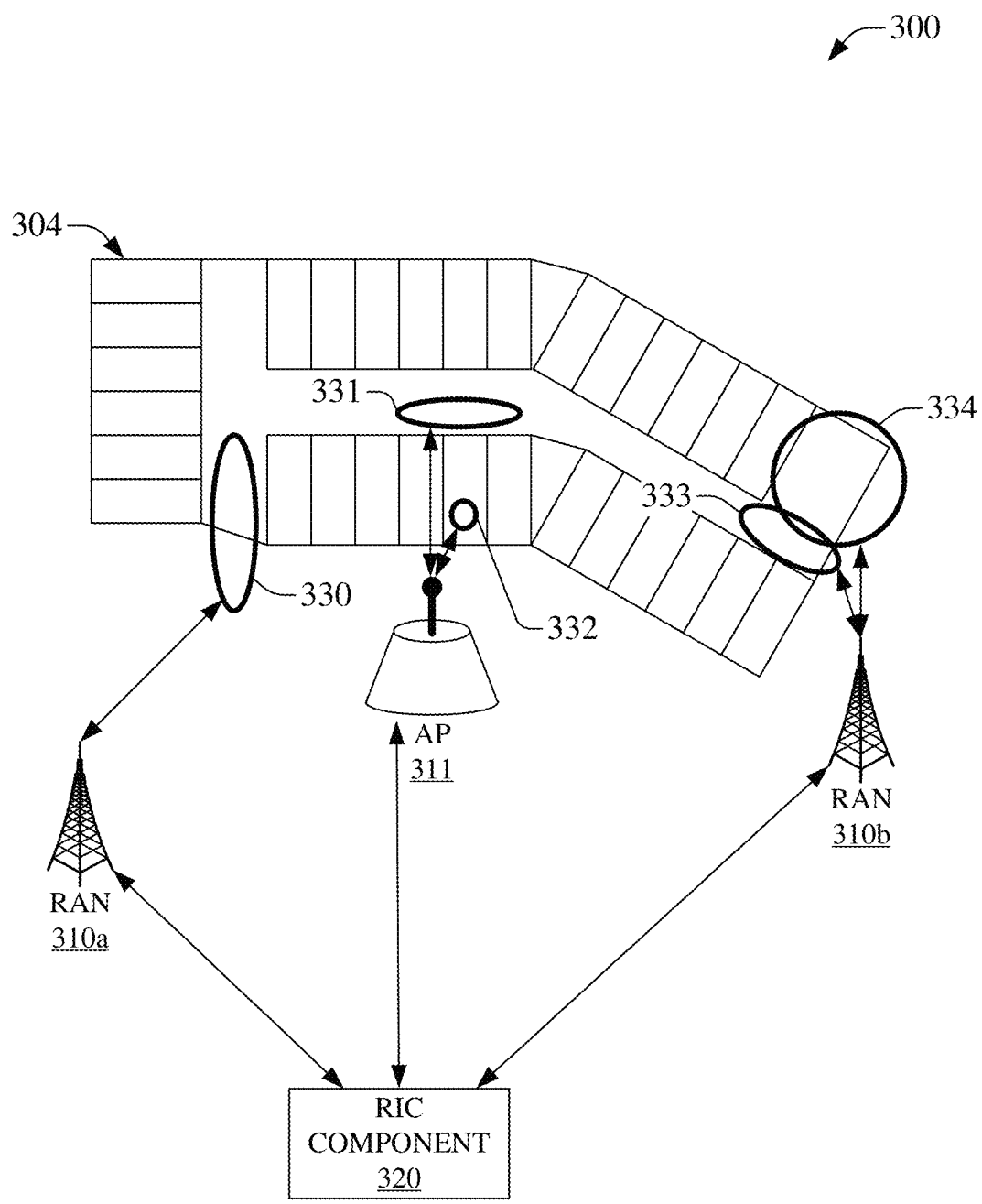
FIG. 3 is an illustration of an example system that can enable providing tailored areas of wireless network coverage based on a predetermined device cluster model employing different types of base stations, in accordance with aspects of the subject disclosure.

FIG. 3 is an illustration of a system 300, which can facilitate providing tailored areas of wireless network coverage based on a predetermined device cluster model employing different types of base stations, in accordance with aspects of the subject disclosure. System 300 can comprise a shopping mall 304 that can be served by RAN 310*a*, RAN 310*b*, AP 311, etc. RIC 320 can communicate beam parameters to RAN 310*a*, RAN 310*b*, AP 311, etc. The beam parameters can be based on a selected cluster model. The cluster model can be selected from a group of cluster models based on current or predicted characteristics of the wireless network environment, devices, RAN/APs, antennas, etc. As an example, an entrance to mall 304 can be historically associated with a threshold UE density, and a cluster model can be selected to provide coverage to wireless network region 330 via a first beam from RAN 310*a*. The first beam can be tailored, e.g., based on beam parameters corresponding to the selected cluster model, to provide coverage to devices in the entrance to mall 304 but not in the shops on either side of the entrance, which can be served by other beams. Similarly, AP 311 can receive beam parameters for two beams, a second beam covering devices in a seating area and having coverage area 331, and a third beam for a high demand device in coverage area 332. Further, RAN 310b can provide a fourth beam 333 and fifth beam 334 covering a food court based on bream parameters associated with selected cluster models by RIC 320. In an embodiment, the food court can, for example, have beams 333 and 334 based on different network demands for the two beams, such as beam 333 providing a first average bandwidth and beam 334 providing a second average bandwidth, based on different UE densities in the two corresponding regions, e.g., beam 333 can be smaller but have a higher UE density than larger beam 334 with a lower UE density, based on different environmental features of mall 304, e.g., a large metal art piece can exist in the food court of mall 304 and splitting one large footprint beam (not illustrated) into two smaller footprint beams, e.g., 333 and 334, can provide better network performance (e.g., the art piece can be located between beam 333 and beam 334), etc.

Figure 4:
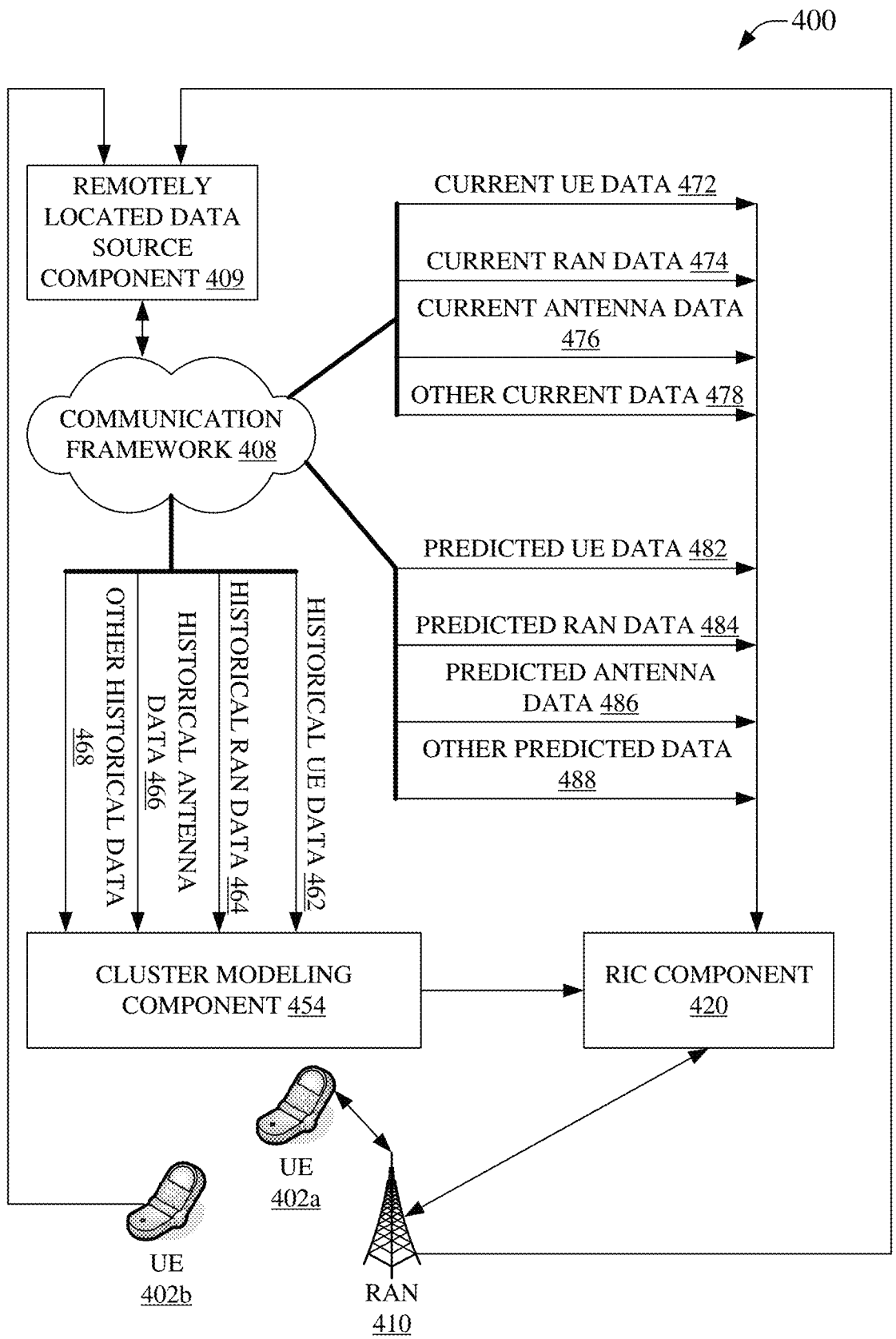
FIG. 4 illustrates an example system that can facilitate wireless network coverage that can be altered based on a predetermined device cluster model to provide a tailored beam of radio energy that can serve a cluster of devices, wherein the predetermined device cluster model can be selected from a group of predetermined device cluster models based on a current key performance indicator value (KPI), a predicted key performance indicator value, etc., in accordance with aspects of the subject disclosure.

FIG. 4 is an illustration of a system 400, which can enable wireless network coverage that can be altered based on a predetermined device cluster model to provide a tailored beam of radio energy that can serve a cluster of devices, wherein the predetermined device cluster model can be selected from a group of predetermined device cluster models based on a current key performance indicator value (KPI), a predicted key performance indicator value, etc., in accordance with aspects of the subject disclosure. System 400 can comprise RAN 410 that can receive beam parameters from RIC 420 to enable generating a beam corresponding to the beam parameters to, for example, provide coverage to one or more UEs 402a, etc.

RIC 420 can select a cluster model of a group of cluster models received from cluster modeling component 454. In an embodiment, cluster modeling component 454 can be comprised in a core network component, e.g., core network component 140, 240, etc. In an embodiment, cluster modeling component 454 can determine cluster models for one or more RICs, e.g., RIC 420, etc. In an aspect, cluster modeling component 454 can determine a cluster model based on historical information received from remotely located data source component 409 via communication framework 408. Remotely located data source component 409 can be nearly any source of current, historical, or predicted/inferred information, e.g., a data store that aggregates historical network information such as historical KPIs, historical location data, historical environmental data, historical weather data, historical RAN data, historical antenna data, etc., for one or more portions of a wireless network. Remotely located data source component 409, for example, can also be a RAN of the wireless network that sources historical RAN/antenna data to cluster modeling component 454, a UE in the wireless network that sources historical UE data to cluster modeling component 454, a geographic information system (GIS) that communicates historical geographical topology, building, construction, road, or other historical environmental information to cluster modeling component 454, etc. In an aspect, remotely located data source component 409 can be one or more devices, e.g., a single data store, a data store and a UE, multiple UEs and multiple RAN components, etc., for example UE 402b, RAN 410, etc., can provide data as remotely located data source components, or to remotely located data source component 409, such that the data from UE 402b, RAN 410, etc., is accessible to cluster modeling component 454, to RIC component 420, etc., via communications framework 408.

Cluster modeling component 454 can, for example, receive historical UE data 462, historical RAN data 464, historical antenna data 466, and other historical data 468, from remotely located data source component 409. This received historical data can be employed by cluster modeling component 454 to generate one or more cluster models that precompute beam parameters. These cluster models can correspond to characteristics and/or conditions of a wireless network, environment of the wireless network, devices using the wireless network, etc. Accordingly, for a given set of current or anticipated conditions and characteristics an appropriate cluster model can be selected and the precomputed beam parameters for the selected cluster model can be employed to cause a beam according to the beam parameters. Cluster models can also be ranked, for example by energy consumption, network performance characteristics, etc., such that where more than one cluster model satisfies a given set of current or anticipated conditions and characteristics, a cluster model can be selected based on the rank. In another aspect, a rank of a cluster model can be considered prior to selection based on a set of current or anticipated conditions and characteristics, e.g., selection can be from sufficiently highly ranked cluster models which can be fewer cluster models than the whole group of cluster models and can enable faster selection with less computation related to comparing the set of current or anticipated conditions and characteristics against the cluster models available for selection.

RIC component 420 can receive current and/or predicted data via communication framework 408 from remotely located data source component 409. The current and/or predicted data can comprise current UE data 472, current RAN data 474, current antenna data 476, and other current data 478, predicted UE data 482, predicted RAN data 484, predicted antenna data 486, and other predicted data 488, etc., from remotely located data source component 409. As previously stated, remotely located data source component 409 can be one or more devices, e.g., a single data store, a data store and a UE, multiple UEs and multiple RAN components, etc. RIC 420 can select a cluster model of the group of cluster models received from cluster modeling component 454 based on the current and/or predicted data. As an example, RIC 420 can select a cluster model that expands a footprint of an existing beam based on an inference that a UE will be proximate to the existing beam based on the UE moving towards the existing beam, which can enable the UE to be covered by an expanded beam earlier than the UE would have entered the existing beam. As another example, a predicted increase in UE density in a mall food court around the lunch hour, e.g., an inference based on historical data, can be employed in selecting a cluster model for the increased UE density at a predicted time, e.g., near the lunch hour, that can, for example, generate more beams covering a region previously covered by fewer beams, which can allow the increased count of UEs to experience satisfactory wireless network performance by having fewer UEs in each of the increased count of beams. Similarly, for example, a prediction of a decrease in UE density after the lunch hour can enable RIC 420 to select, at the close of the lunch hour, a cluster model that returns to the fewer beams from the previous example.

Figure 5:
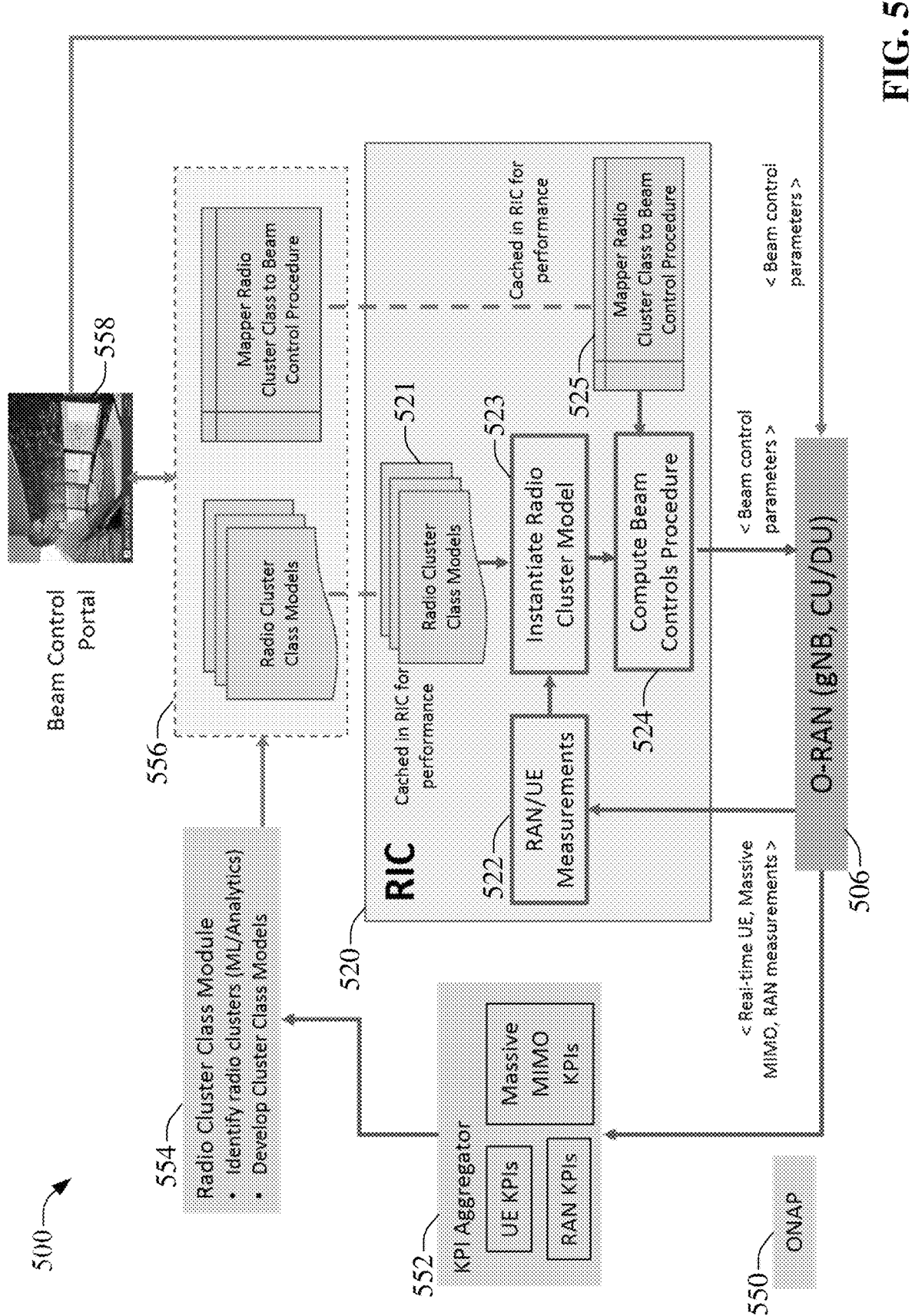
FIG. 5 is an illustration of an example system that can facilitate wireless network coverage via an example open radio access network (O-RAN) that can be altered via an example open network automation platform (ONAP) based on a predetermined device cluster model provided to a radio intelligent controller (RIC), in accordance with aspects of the subject disclosure.

FIG. 5 is an illustration of a system 500, which can enable wireless network coverage via an example open radio access network (O-RAN) that can be altered via an example open network automation platform (ONAP) based on a predetermined device cluster model provided to a radio intelligent controller (RIC), in accordance with aspects of the subject disclosure. System 500 can comprise RIC 520 that can receive radio cluster class models 521, e.g., cluster models, from ONAP component(s) 550. ONAP component(s) 550 can comprise KPI aggregator component 552, radio cluster class module component 554, storage component 556, etc. ONAP component 550 can receive measurements from UEs, antennas, e.g., massive multiple input multiple output (MIMO) antennas, etc., and RAN components. These measurements can comprise corresponding KPIs that can be aggregated by KPI aggregator component 552. The aggregated KPIs can be regarded as historical data related to a wireless network communicating with ONAP component 550, e.g., O-RAN component(s) 506, etc.

Historical data from KPI aggregator component 552 can be received by radio cluster class module component 554 and employed in determining cluster models, e.g., radio cluster class models, etc. Radio cluster class module component 554 can employ machine learning (ML) analytics, etc., e.g., artificial intelligence techniques, etc., to develop radio cluster class models. The radio cluster class models can be stored by storage component 556. In an embodiment, the radio cluster class models at storage component 556 can correspond to some or all of a wireless network, e.g., wireless coverage area served by O-RAN component(s) 506, etc.

RIC 520 can receive a group of radio class cluster models 521 from storage component 556 of ONAP component(s) 550. In an embodiment, the group of radio class cluster models 521 can be some or all of the radio class cluster models stored by storage component 556, though generally the group of radio class cluster models 521 is only some of the total stored models, typically those radio class cluster models associated with a particular RAN device, e.g., NodeB, eNodeB, gNodeB, AP, etc., associated with a particular RIC component deployed in the wireless network such that each RIC component stores local copies of radio class cluster models relevant to their portion of O-RAN component(s) 506. Also illustrated is a local cached group of mapper radio cluster class to beam control procedure(s) that can facilitate computation of an instantiated radio cluster model, e.g., the mapper radio cluster class to beam control procedure(s) can be rules that facilitate determining beam parameters based on a selected cluster model, etc.

O-RAN component(s) 506 can communicate current RAN and UE measurements, as distinct from measurements over time that are aggregated by KPI aggregator component 552, to RAN/UE measurement component 522 of RIC 520, which measurements can enable selection of a cluster model from the group of radio cluster class models 521. The selected cluster model can be instantiated by instantiation cop 523 base on RAN/UE measurement information from RAN/UE measurement component 522 and on mapper radio cluster class to beam control procedure(s) received from mapper radio cluster class to beam control procedure component 525. Resulting beam control procedures, e.g., beam parameters, etc., can be communicated from RIC 520 to a RAN/AP device of O-RAN component(s) 506 and can result in deploying a beam in accord with the beam control procedures. In an embodiment, a user interface component, e.g., beam control portal 558, etc., can enable adaptation of radio cluster class modules stored in storage component 556, mapper radio cluster class to beam control procedures also stored in storage component 556, and control of beam control parameters at a RAN/AP device of O-RAN component(s) 506, which can allow for operator control of RAN beams and/or control of cluster models and associated rules/procedures for mapping from a cluster model to a beam control parameter.

Adaptation or deploying tailored beams can be viewed, in regard to system 500, as comprising processing of UE performance data from various regions of a wireless network via ONAP, e.g., via KPI aggregator 552. This can comprise performing cluster analysis on historical KPI data to identify different clusters occurring in the historical data record. The resulting historical clusters can then be analyzed to identify classes of radio clusters and to develop corresponding cluster models for the different classes of clusters, e.g., a first class, for example, self-driving vehicles, etc., can be associated with high speed and low latency network requirements, a second class, for example, common cell phone usage, can be associated with high bandwidth and moderate latency network requirements, a third class, for example, IoT devices, can be associated with tolerance of low bandwidth, high latency, etc., which class characteristics can be used to develop associated cluster models. Beam control procedures can be developed to achieve the network requirements of the different classes and conform to best practices. The cluster models and beam control procedures, or portions thereof that are relevant to a RAN device of a RIC, can be communicated to the RIC and employed in adapting beams based on current performance of the wireless network at the RAN device, e.g., instantiation of a cluster model of the cluster models and determining beam parameters based on the selected cluster model and related beam control procedures. The determine beam parameters can then be propagated to the RAN to cause the adaptation of the wireless network. An operator can interact with the disclosed subject matter, for example via a user interface that can display a dashboard of clusters, regions, etc., e.g., a graphical user interface, etc., can display performance, quality of experience (QoE) information, etc., for example via colors, animations, sounds, etc., that can aid in communicating the health, performance, faults, capacity, utilization, etc., for a region, cluster, etc. Moreover, an operator can enter information that can alter the automated process of further beam adaptations, e.g., changing a mapping rule, changing a cluster model, changing analytics, altering machine learning data sets, e.g., further training a ML algorithm, etc., or numerous other operator interactions. It is noted that system 500 is merely one example embodiment and the disclosed subject matter is not limited to this particular example whereas the disclosed subject matter can be practiced in other embodiments, e.g., automation technologies other than ONAP can be employed, RAN systems other than O-RAN can be employed, etc.

Figure 6:
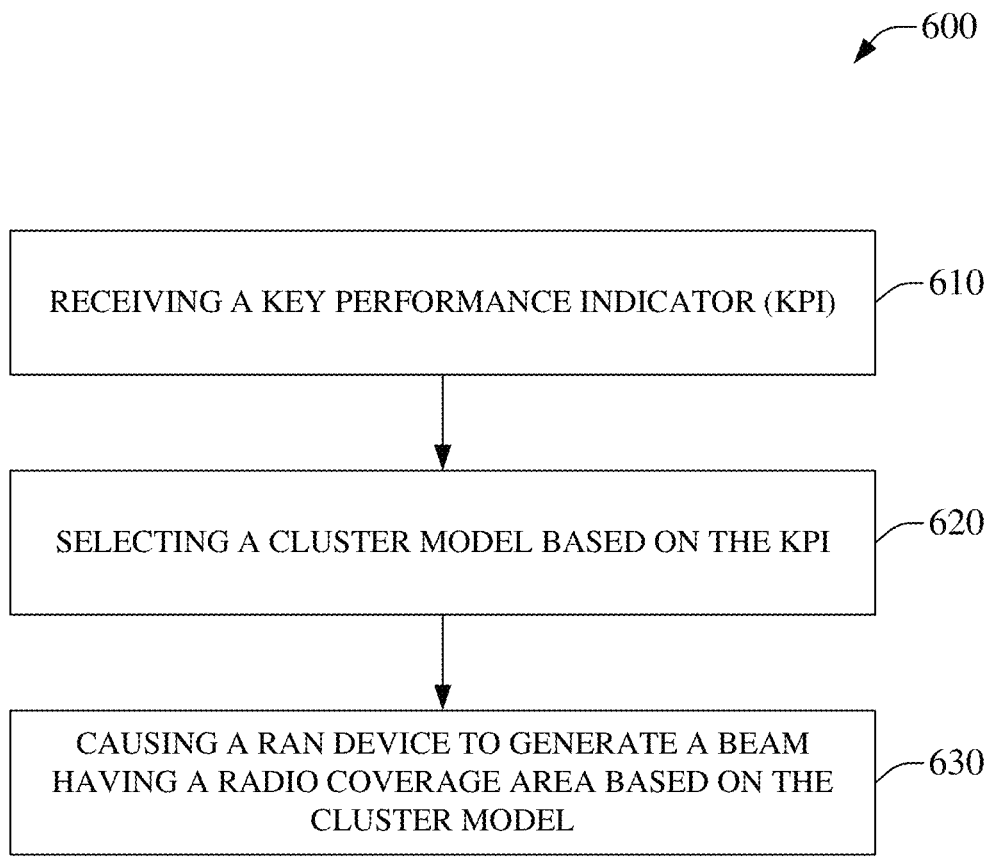
FIG. 6 is an illustration of an example method enabling altering wireless network coverage based on a predetermined device cluster model that can be selected based on a key performance indicator value, in accordance with aspects of the subject disclosure.

FIG. 6 is an illustration of an example method 600, which can facilitate altering wireless network coverage based on a predetermined device cluster model that can be selected based on a key performance indicator value, in accordance with aspects of the subject disclosure. At 610, method 600 can comprise receiving a key performance indicator (KPI) value. In an embodiment, the KPI can reflect a current or expected UE characteristic, RAN characteristic, antenna characteristic, environmental characteristic, or other characteristic pertinent to selecting a cluster model of cluster models corresponding to a RAN device.

At 620, method 600 can comprise selecting a cluster model based on the KPI received at 610. The cluster model can be selected from cluster models. In an aspect, a first group of cluster models related to a RAN device, e.g., relating to providing wireless connectivity to devices in a region affiliated with the RAN device, etc., can be cached from a second, typically larger, group of cluster models that can correspond to several regions of a wireless network. As an example, a core network component can determine cluster models for a wireless network comprising a first and a second RAN device serving different regions of the wireless network and a first portion of the cluster models that relate to the region served by the first RAN device can be communicated to a first RIC component as a first group of cluster models, while a second portion of the cluster models that relate to the region served by the second RAN device can be communicated to a second RIC component as a second group of cluster models, allowing selection from the first group of cluster models to consider less than all of the cluster models determined by the core network device, which can allow the selection of a cluster model from the group of cluster models at the first RIC component to occur more rapidly than if a larger set of cluster models, e.g., all the cluster models for the several RANs of the wireless network, were combed through.

Method 600, at 630, can comprise causing a RAN device to generate a beam having a radio coverage area based on the cluster model. At this point method 600 can end. In an embodiment, beam parameters can be determined based on the selected cluster model at 620. The beam parameters can be communicated to the RAN device which can employ the beam parameters to cause a beam in accord with those parameters. In an aspect, causing the beam can comprise generating a new beam according to the selected cluster model, adapting an existing beam according to the selected cluster model, terminating an existing beam according to the selected cluster model, or combinations thereof. This can result in splitting or merging of existing beams, joining new beams into existing beams, etc.

Figure 7:
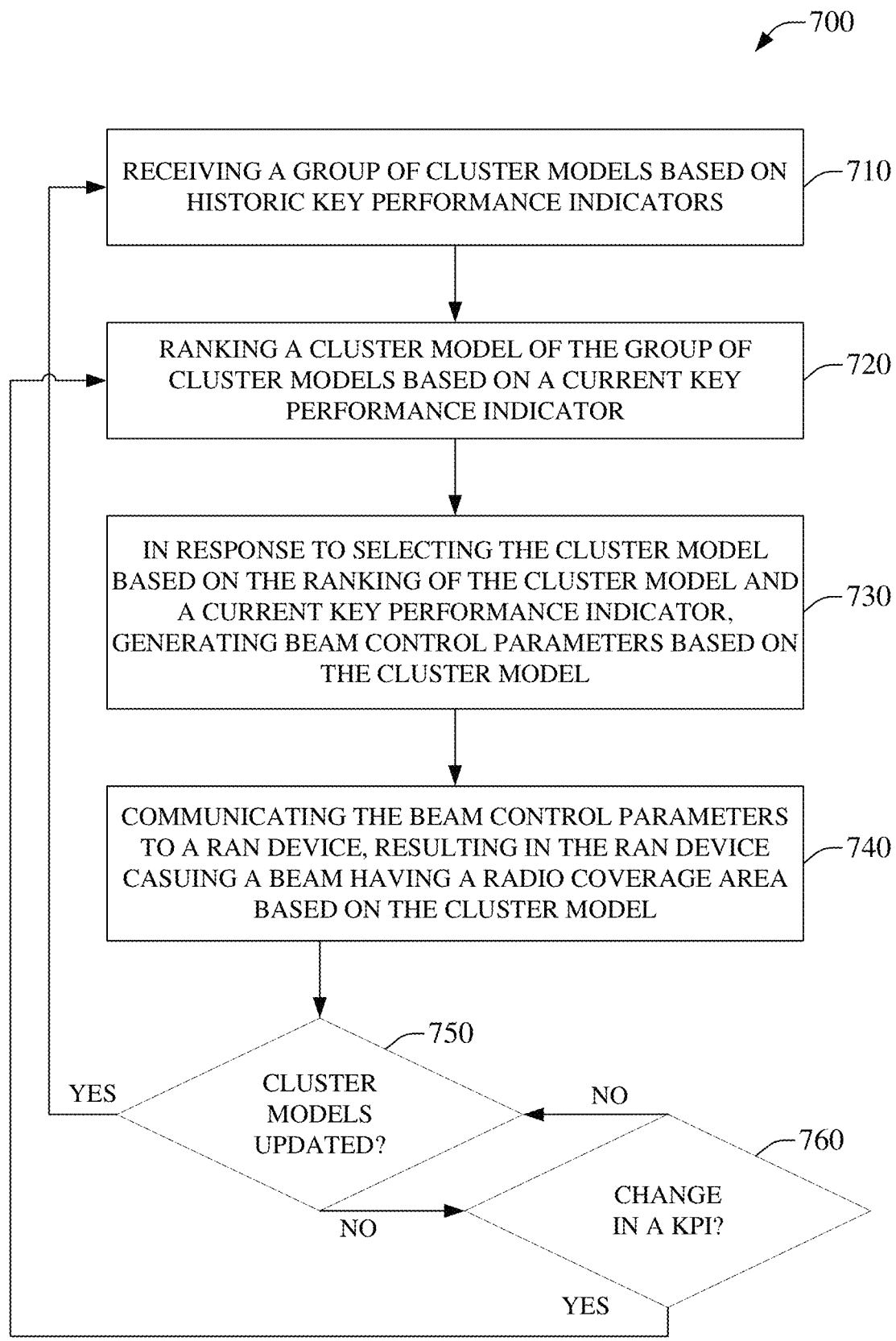
FIG. 7 illustrates an example method facilitating adapting wireless network coverage via communication of a beam control parameters based on a predetermined device cluster model selected based on a rank of the predetermined device cluster model and a key performance indicator value, in accordance with aspects of the subject disclosure.

FIG. 7 illustrates example method 700 facilitating adapting wireless network coverage via communication of a beam control parameters based on a predetermined device cluster model selected based on a rank of the predetermined device cluster model and a key performance indicator value, in accordance with aspects of the subject disclosure. Method 700, at 710, can comprise receiving a group of cluster models based on historic KPIs. In an embodiment, a core network component can determine cluster models for a wireless network comprising a plurality of RAN devices, e.g., a first RAN device, a second RAN device, etc., wherein each of the RAN devices serves a corresponding region of the wireless network. In this embodiment, a first portion of the cluster models that relate to a first region served by the first RAN device can be the group of cluster models received at 710. In an aspect, the cluster models can be determined based on historic KPIs, etc., e.g., historical UE data, historical RAN data, historical antenna data, and other historical data, can be employed by a cluster modeling component, e.g., cluster modeling component 454, etc., to generate one or more cluster models. These cluster models can correspond to characteristics and/or conditions in a wireless network, an environment of the wireless network, devices using the wireless network, etc.

Method 700, at 720, can comprise ranking a cluster model of the group of cluster models based on a current KPI. Cluster models can be ranked, for example by energy consumption, network performance characteristics, etc., such that where more than one cluster model satisfies a given set of current or anticipated conditions and characteristics, a cluster model can be selected based on the rank. In another aspect, a rank of a cluster model among the group of cluster models can be considered prior to selection based on a set of current or anticipated conditions and characteristics, e.g., selection can be performed from cluster models having a sufficient ranking, which can be fewer cluster models than the whole group of cluster models, which can enable faster selection because fewer cluster models are considered as possible selections. As an example of ranking, a first cluster model of the group of cluster models can be ranked higher than a second cluster model of the group based on a first bandwidth of the first cluster model being greater than a second bandwidth of the second cluster model. As a further example of ranking, a first cluster model of the group of cluster models can be ranked lower than a second cluster model of the group based on a first latency of the first cluster model being greater than a second latency of the second cluster model. As a third example of ranking, a first cluster model of the group of cluster models can be ranked higher than a second cluster model of the group based on a first beam energy consumption of the first cluster model being lower than a second beam energy consumption of the second cluster model. Accordingly, this can allow for filtering the group of cluster models, for example, to those having a threshold ranking related to bandwidth, latency, energy consumption, etc., such that selection can be based on the filtered group of cluster models. Alternatively, this can also allow for choosing a sufficiently ranked cluster model from candidate cluster models that satisfy a selection rule, for example, where the selection rule relates to a threshold bandwidth, latency, energy consumption, etc., e.g., more than one cluster model of the group of cluster models can satisfy the selection rule and ranking can then be employed to select the cluster model from those cluster models that were determined to satisfy the selection rule.

At 730, method 700 can comprise, in response to selection of a cluster model based on a current KPI and ranking of a cluster model, generating beam control parameters based on the selected cluster model. Whereas the group of cluster models can be based on historic KPIs, etc., a cluster model of the group of cluster models can reflect a particular set of conditions, characteristics, etc., that has been modeled. Accordingly, a current KPI can be used to find and select a cluster model that, for example, approximates or matches the current conditions, characteristics, etc. Whereas the cluster model can be related to predetermined beam parameters, these predetermined beam parameters can be readily used to implement a beam according to the cluster model. In an aspect, current wireless network characteristic can be used to select a cluster model and determine corresponding precomputed beam parameters.

At 740, the beam control parameters can be communicated to a RAN device. This can result in the RAN device causing a beam according to the selected cluster model, e.g., a beam having a radio coverage area based on the selected cluster model. Beam parameters can correspond to modeled historical wireless network conditions. Accordingly, where current KPIs, etc., can be 'matched' to a cluster model derived from historical KPIs, etc., corresponding precomputed beam parameters can be used to instantiate a beam that can already be determined to be appropriate for the cluster model and therefore can be expected to also be appropriate for the 'matching' current conditions.

At 750, it can be determined if a cluster model is updated. Where the cluster model has been updated, method 700 can proceed to 710. Where the cluster model has not been updated, method 700 can, at 760, determine if a KPI has changed. Where a KPI has changed, method 700 can proceed to 720. Where the KPI has not changed, method 700 can proceed to 750. In an aspect, continued aggregation of historical KPIs, etc., can result in alteration of a cluster model. If a cluster model is updated, the corresponding precomputed beam parameters can also be changed. As such, proceeding to 710 again can facilitate 'review' of the selected cluster model, e.g., if the previously selected cluster model is not as good a fit as the updated cluster model, then the updated cluster model can be selected to replace the previously selected cluster model. Similarly, where the KPIs, etc., change, e.g., the current or predicted conditions of the wireless network change, then it can be beneficial to undergo the ranking and selection of a cluster model again to enable method 700 to adapt the network coverage area in real-time or near real-time.

Figure 8:
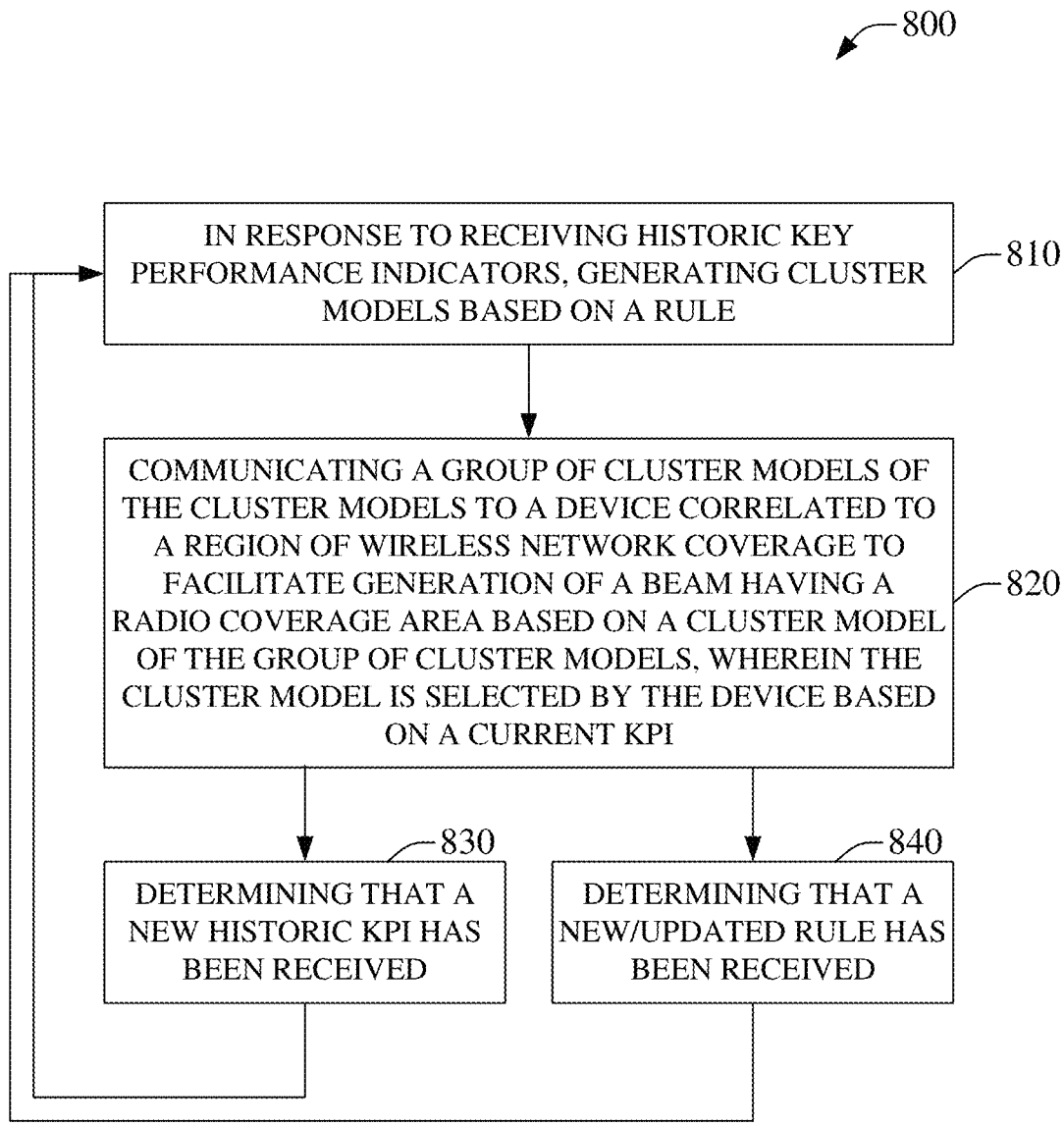
FIG. 8 illustrates an example method enabling communication of updatable relevant predetermined device cluster models to enable altering wireless network coverage based on a predetermined device cluster model selected from the updatable relevant predetermined device cluster models, in accordance with aspects of the subject disclosure.

FIG. 8 illustrates example method 800, which can enable communication of updatable relevant predetermined device cluster models to enable altering wireless network coverage based on a predetermined device cluster model selected from the updatable relevant predetermined device cluster models, in accordance with aspects of the subject disclosure. Method 800, at 810, can comprise generating cluster models based on received historic KPIs according to a rule. Cluster models for a wireless network comprising a plurality of RAN devices, e.g., a first RAN device, a second RAN device, etc., can be determined based on historic information, e.g., historical UE data, historical RAN data, historical antenna data, and other historical data, can be employed by a cluster modeling component, e.g., cluster modeling component 454, etc., to generate one or more cluster models. These cluster models can correspond to characteristics and/or conditions in a wireless network, an environment of the wireless network, devices using the wireless network, etc. As an example, a rule can designate that a beam support a threshold bandwidth per device. Accordingly, in this example, a higher UE density can result in smaller footprint beams, e.g., more UEs per square meter results in a smaller beam to reduce the count of UEs using the beam where the beam can have a fixed total bandwidth to share among devices using the beam. In an embodiment, a RIC component can generate the cluster models based on historical KPIs, etc., relevant to RAN devices affiliated with the RIC component. In some embodiments a core network component can generate the cluster models and communicate a relevant group of cluster models to one or more RICs of a wireless network, wherein the relevancy can be based on the coverage area(s) of RAN device(s) affiliated with each of the one or more RICs.

At 820, method 800 can comprise communicating a group of cluster models of the cluster models to a device, e.g., a RIC component, etc., correlated to a region of wireless network coverage, for example, a RIC component can be correlated to a region of a wireless network based on a coverage area associated with a RAN device affiliated with the RIC component. The group of cluster models can facilitate generation of a beam having radio coverage area based on a cluster model of the group of cluster models, e.g., a cluster model can be selected from the group of cluster models such that predetermined beam parameters corresponding to the selected cluster model can be communicated to a RAN device that can cause a beam in accord with the predetermined beam parameters. The cluster model can be selected based on a current KPI, etc.

At 830, method 800 can comprise, determining that a new historic KPI has been received. Whereas KPI data can continue to be generated in relation to a wireless network, this new KPI data can become new historical KPI data as newer KPI data continues to be collected. As such, the new historical KPI data can be used in generating, updating, altering, etc., cluster models. As an example, as population in a town grows over the years, the density of UEs can increase, which can be reflected in UE density KPI data. In this example, it can be beneficial to generate new cluster models that correspond to beam parameters that better serve the higher density of UEs in the town.

At 840, method 800 can comprise, determining that a new/updated rule has been received. Changes to a rule or receiving a new rule can result in a corresponding change to cluster models. As an example, a rule that designated that a beam support a threshold bandwidth per device can be updated to change the threshold bandwidth. Accordingly, in this example, a higher UE density can still result in reducing beam footprint, e.g., more UEs per square meter can results in a smaller beam to reduce the count of UEs using the beam where the beam can have a fixed total bandwidth to share among devices using the beam. However, the changed threshold bandwidth of the modified rule can actually alter the size of any beam in the cluster model, for example, where the threshold bandwidth per device is doubled, the beams can have correspondingly smaller footprints because each device is now allocated twice the bandwidth, e.g., only half the UEs of the old rule can be supported per beam on the updated rule. Similar, changes to any rule related to determining cluster models can result in re-determining, adapting, etc., cluster models according to the new/updated rule.

Figure 9:
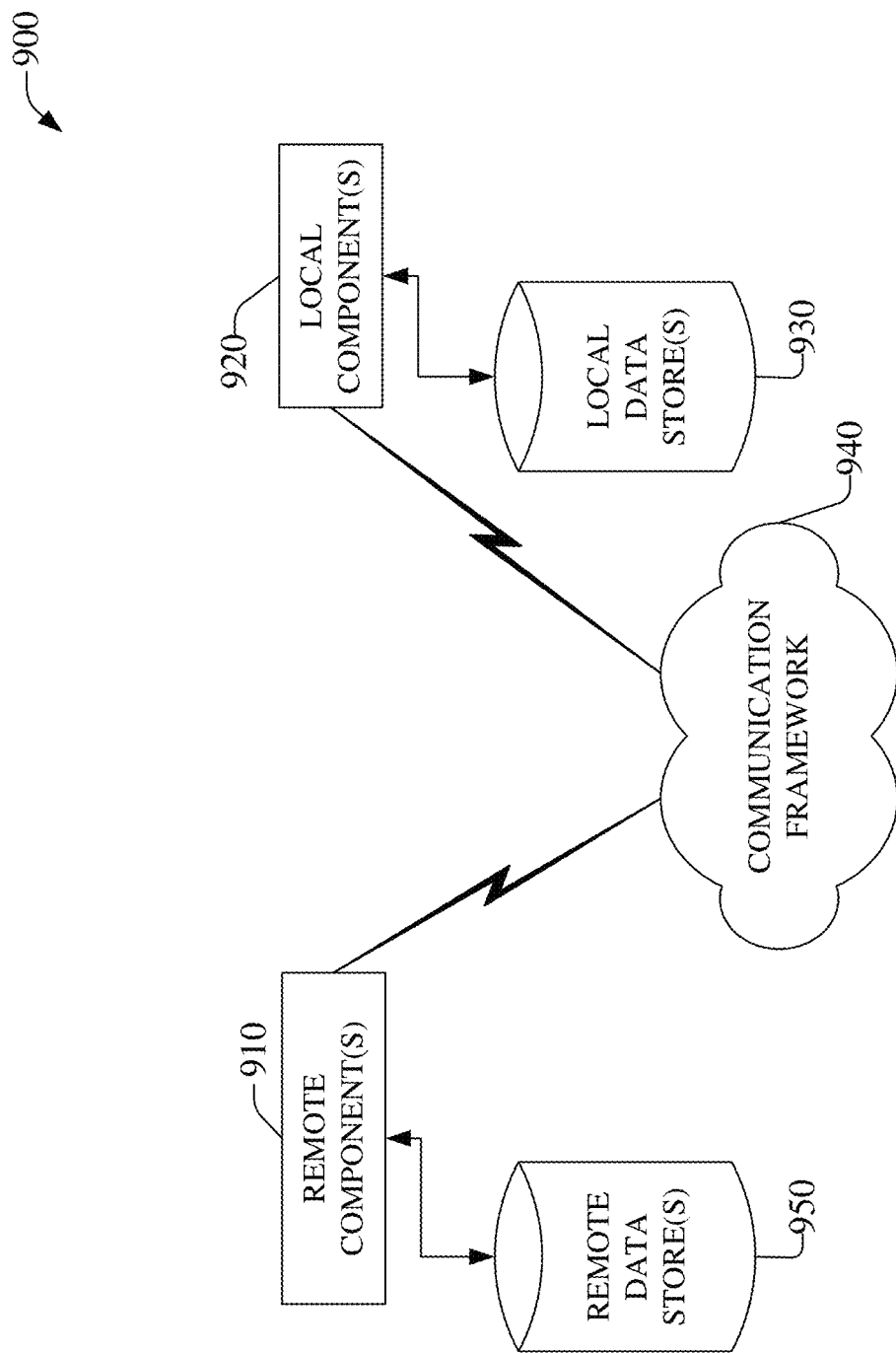
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise core network component 140, 240, etc., other RIC components, e.g., if RIC 220 is local then RIC 222, RIC 224, etc., can be remote, etc., remotely located data source component 409, etc., cluster modeling component 454, etc., ONAP 550, KPI aggregator 552, radio class cluster module 554, storage device 556, beam control portal 558, O-RAN component(s) 506, etc.

The system 900 also comprises one or more local component(s) 920. The local component(s) 920 can be hardware and/or software (e.g., threads, processes, computing devices). In some embodiments, local component(s) 920 can comprise RIC component 120, 220, 222, 224, 320, 420, 520, etc., RAN component 110, 210*a*-210*h*, 310*a*, 310*b*, 410, AP 211, AP 311, etc., radio cluster class model cache 521, RAN/UE measurement cache 522, beam mapper cache 525, radio cluster instantiation component 523, beam parameter determining component 524, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. As an example, core network component 140 can store determined cluster models, e.g., radio cluster class model component 554 of ONAP 550 can generate cluster models that can be stored at storage device 556. Similarly, local component(s) 920 can be operably connected to one or more local data store(s) 930, that can be employed to store information on the local component(s) 920 side of communication framework 940. As an example, RIC component 120 can store a group of cluster models determined by core network component 140. In an aspect, the group of cluster models stored at RIC component 120 can be fewer cluster models than are determined by core network component 140, e.g., the group of cluster models can correspond to the coverage area of RAN component 110, etc.

Figure 10:
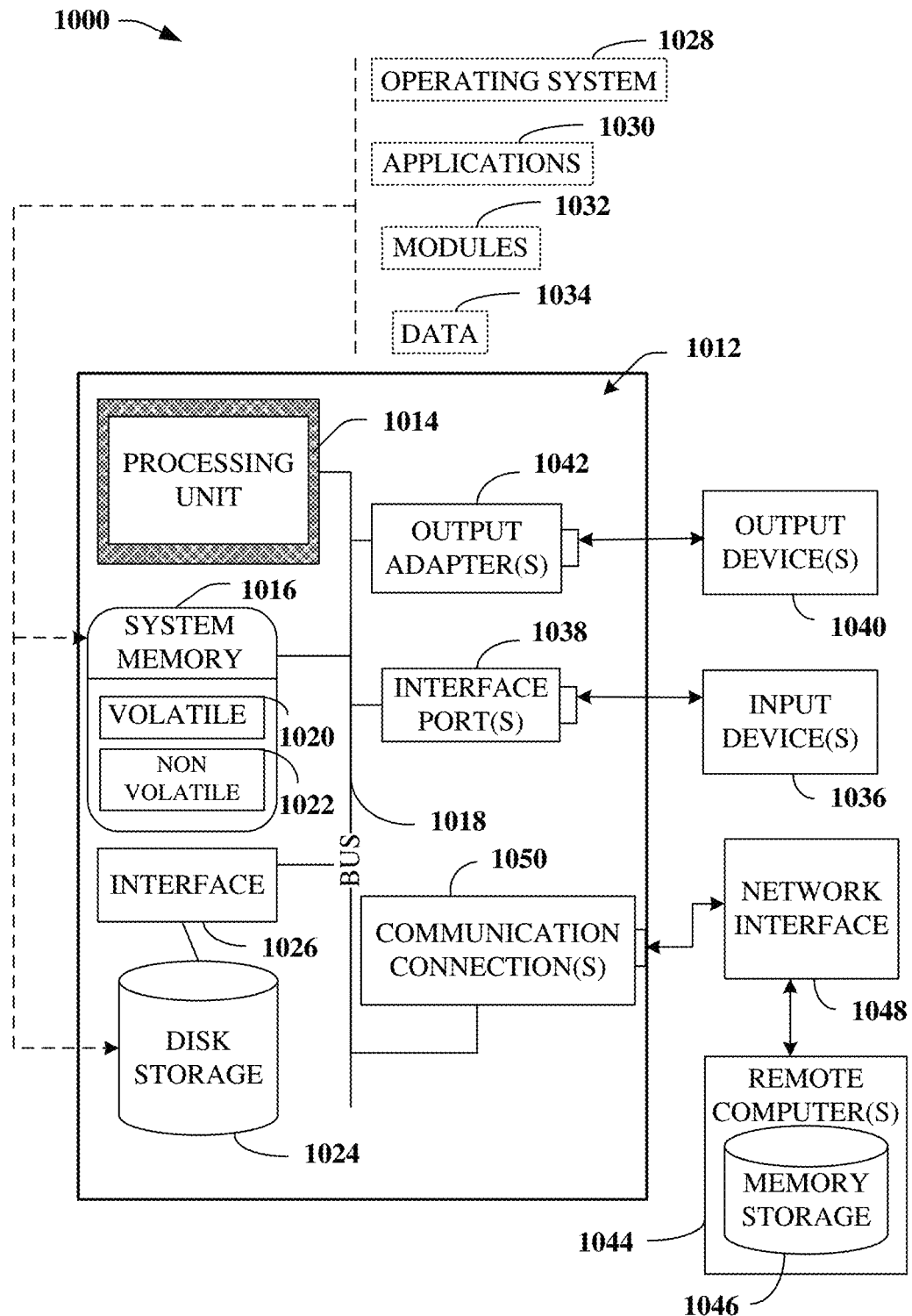
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in RIC component 120-520, etc., core network component 140-240, etc., cluster modeling component 454, etc., RAN component 110, 210*a-h*, 310*a-b*, 410, etc., AP 211-311, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising initiating a slice event based on a slice event instruction corresponding to analysis of network analytics for various portions of a network, and can be based on rules and/or inferences related to the analysis of the network analytics.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF) waves. The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A device, comprising:
a processor; and
a memory that stores executable instructions that, when executed by the processor, facilitate performance of operations, comprising:
determining a first ranking of a first potential user equipment cluster coverage region of potential user equipment cluster coverage regions based on a first predicted performance of the first potential user equipment cluster coverage region;

determining first operation and performance requirements of a first user equipment of a plurality of user equipment in a service region enabled via a network;

selecting a first cluster comprising the first user equipment and second ones of the plurality of user equipment, wherein selecting the first cluster is based on the first operation and performance requirements of the first user equipment;

in response to determining a first distribution of the second ones of the plurality of user equipment comprised in the first cluster, selecting the first potential user equipment cluster coverage region based on the first ranking and the first distribution;

adapting a first radio device performance based on the first potential user equipment cluster coverage region; and in response to determining that a second user equipment of the plurality of user equipment satisfies a rule related to a level of similarity between the first operation and performance requirements of the first user equipment and second operation and performance requirements of the second user equipment, adapting the first cluster to further comprise the second user equipment.

2. The device of claim 1, wherein the second ones of the user equipment comprise more than one of the plurality of user equipment.

3. The device of claim 1, wherein the operations further comprise:

determining a second ranking of a second potential user equipment cluster coverage region, wherein the second potential user equipment cluster coverage region is comprised in the potential user equipment cluster coverage regions, and wherein the second potential user equipment cluster coverage region is based on a second predicted performance for the second potential user equipment cluster coverage region;

determining second operation and performance requirements for a second user equipment of the plurality of user equipment in the service region enabled via the network;

selecting a second cluster comprising the second user equipment and third ones of the plurality of user equipment, wherein selecting the second cluster is based on the second operation and performance requirements for the second user equipment;

in response to determining a second distribution for the third ones of the plurality of user equipment comprised in the second cluster, selecting the second potential user equipment cluster coverage region based on the second ranking and the second distribution; and adapting a second radio device performance based on the second potential user equipment cluster coverage region.

4. The device of claim 3, wherein adapting the first radio device performance results in a first cluster coverage region comprising a first service location in the service region enabled via the network, wherein adapting the second radio device performance results in a second cluster coverage region comprising a second service location in the service region enabled via the network, and wherein the first service location is a different service location than the second service location.

5. The device of claim 3, wherein adapting the first radio device performance results in a first cluster coverage region comprising a first service location in the service region enabled via the network, wherein adapting the second radio device performance results in a second cluster coverage region comprising a second service location in the service region enabled via the network, and wherein the first service location and the second service location are the same service location.

6. The device of claim 3, wherein adapting the first radio device performance results in a first cluster coverage region that is a different coverage region than a second cluster coverage region resulting from adapting the second radio device performance.

7. The device of claim 3, wherein adapting the first radio device performance results in a first cluster coverage region that is a same coverage region as a second cluster coverage region resulting from adapting the second radio device performance.

8. The device of claim 1, wherein the first predicted performance of the first potential user equipment cluster coverage region is based on historical user equipment performance corresponding to the first potential user equipment cluster coverage region.

9. The device of claim 1, wherein adapting a first radio device performance results in altering a shape of a radio-frequency lobe associated with the first radio device.

10. A method, comprising:

determining, by a system comprising a processor, a ranking of a potential cluster coverage region of potential cluster coverage regions based on a predicted performance of the potential cluster coverage region;

in response to determining, by the system, first resource requirements of a first user equipment of a group of user equipment in a service region enabled via a wireless network, selecting a cluster having a distribution of user equipment, wherein the cluster comprises the first user equipment, and wherein selecting the cluster is based on the first resource requirements;

in response to determining, by the system, that second resource requirements of a second user equipment of the group of user equipment satisfy a rule related to a level of similarity between the first resource requirements and the second resource requirements, adapting the cluster to further comprise the second user equipment;

selecting, by the system, the potential cluster coverage region based on the ranking and the distribution; and causing, by the system, a change in a performance of a radio device according to the potential cluster coverage region.

11. The method of claim 10, further comprising determining, by the system, the potential cluster coverage region further based on historical key performance indicator values.

12. The method of claim 11, further comprising associating, by the system, the potential cluster coverage region with a predetermined radio beam parameter based on the historical key performance indicator values.

13. The method of claim 10, wherein causing the change in the performance of the radio device comprises communicating a predetermined radio beam parameter corresponding to the potential cluster coverage region to radio access network equipment resulting in the radio access network equipment causing a radio beam that supports the first user equipment in the potential cluster coverage region.

14. The method of claim 10, wherein causing the change in the performance of the radio device comprises communicating a predetermined radio beam parameter corresponding to the potential cluster coverage region to radio access network equipment resulting in the radio access network equipment causing a radio beam that supports the first user equipment in the potential cluster coverage region and the second user equipment in the potential cluster coverage region.

15. The method of claim 10, wherein causing the change in the performance of the radio device comprises communicating a predetermined radio beam parameter corresponding to the potential cluster coverage region to radio access network equipment resulting in the radio access network equipment causing a radio beam that supports the first user equipment in the potential cluster coverage region, the second user equipment in the potential cluster coverage region, and a third user equipment in the potential cluster coverage region.

16. A non-transitory machine-readable medium, comprising executable instructions that, when executed by a processor, facilitate performance of operations, comprising:
   determining a ranking of a potential cluster coverage region to be selected from potential cluster coverage regions based on a predicted performance of the potential cluster coverage region;
   in response to determining first resource requirements of a first user equipment of a group of user equipment in a network service area, selecting a cluster of user equipment from the group of user equipment, wherein the cluster corresponds to a distribution of the user equipment in the cluster, wherein the cluster comprises the first user equipment, and wherein selecting the cluster is based on the first resource requirements;
   in response to determining that second resource requirements of a second user equipment of the group of user equipment satisfy a rule related to a level of similarity between the first resource requirements and the second resource requirements, adapting the cluster to further comprise the second user equipment; and
   in response to selecting the potential cluster coverage region based on the ranking and the distribution, adapting a radio device performance in accord with the potential cluster coverage region.

17. The non-transitory machine-readable storage medium of claim 16, wherein the cluster of user equipment comprises a third user equipment of the group of user equipment.

18. The non-transitory machine-readable storage medium of claim 16, wherein adapting the radio device performance results in a radio device supporting the first user equipment based on application of a predetermined radio beam parameter corresponding to the potential cluster coverage region.

19. The non-transitory machine-readable storage medium of claim 18, wherein the predetermined radio beam parameter corresponding to the potential cluster coverage region is based on a cluster model determined from a historical key performance indicator value for the radio device.

20. The non-transitory machine-readable storage medium of claim 16, wherein adapting the radio device performance results in a radio device supporting, in the potential cluster coverage region, the first user equipment and at least one other user equipment selected from a group of user equipment comprising the second user equipment and a third user equipment.

* * * * *